United States Patent [19]
Schaefer

[11] 3,725,702
[45] Apr. 3, 1973

[54] INFRARED GAS ANALYZER

[75] Inventor: Werner Schaefer, Oberhochstadt, Germany

[73] Assignee: Hartmann & Braun Aktiengesellschaft, Frankfurt am Main, Germany

[22] Filed: Jan. 29, 1969

[21] Appl. No.: 795,089

[52] U.S. Cl. ............................................. 250/43.5 R
[51] Int. Cl. ................................................. G01n 21/34
[58] Field of Search .................................... 250/43.5

[56] References Cited

UNITED STATES PATENTS 2,924,713  2/1960  Liston ............................... 250/43.5
2,957,076  10/1960  Francis ............................. 250/43.5

FOREIGN PATENTS OR APPLICATIONS 953,952  4/1964  Great Britain ..................... 250/43.5

Primary Examiner—William F. Lindquist
Attorney—Rolf H. Siegemund

[57] ABSTRACT

Detector for analyzer is made up of four gas chambers, an incident pair and a respectively alined pair directly after the incident pair, chambers of the pairs being cross-connected by gas conduits. Detector measures difference in the sums of energy absorbed in cross-connected pairs, when analysis and comparison beams are respectively directed into the alined pairs, giving null readings for null values and with great stability of null point.

5 Claims, 1 Drawing Figure

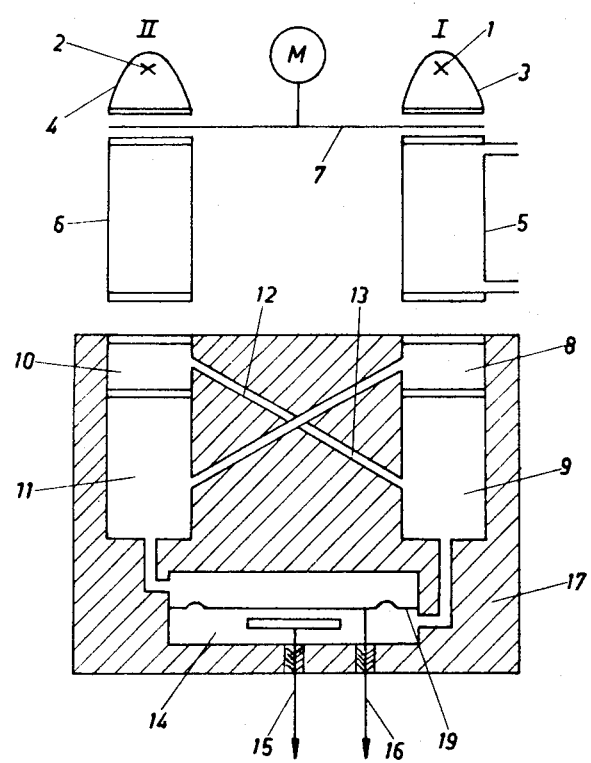

INFRARED GAS ANALYZER

BACKGROUND OF THE PRIOR ART

1. Field of the Invention

Gas filled infrared detector having comparison and analysis chambers with cross compensation chambers.

2. Description of the Prior Art

There have been special problems in the use of infrared gas analysers with highly sensitive detectors. Among these detector problems are the difficulty of obtaining a null point of sufficient stability, as well as dealing with occurring disturbances such as the collection of dust on the cuvette or gas chamber windows and such as fluctuations of applied voltages to radiator filaments.

The invention satisfactorily solves these problems in connection with such infrared instruments wherein detector chambers filled with the gas component of interest are interposed in the paths of radiation and the difference in the absorbed radiant energy in the chambers is measured as a function of the concentration of the gaseous component to be determined. To ascertain the energy difference there are usually thermo-electric sensors in the detector chambers or differential pressure membrane condensers to produce an electrical output signal.

The detector chambers, which in order to obtain the highest possible temperature stability are located in a unitary metal block, can lie one beside the other in two respective paths of radiation, one of which is the analysis path and the other the comparison path, or one ahead of the other in one path as shown in German Pat. Nos. 730,478 and 1,017,385. Ahead of the detector chambers separated cuvettes are disposed which contain, respectively, the gas mixture to be analyzed and a comparison gas that does not absorb radiation in the range of absorption for the analysis gas. Under certain conditions, still additional filtering cuvettes are also introduced for coping with more difficult measuring problems. In practice, for easier amplification of electrical output signals, the radiation beams in the paths are periodically blacked out by a motor driven rotating sector-shutter.

German Pat. No. 1, 017, 385 is concerned with the disposition of detector chambers one after the other to give better null point stability than with the side-by-side chambers. The adjustment to an exact null point by calibration so that the membrane condenser in the detector would produce no effective signal output is however not possible here because conversion of energy by radiation absorption in the characteristically large detector gas chambers cannot proceed in fully equal phase timing.

The problem is partially dealt with in Zeitschrift fur techische Chemie, Verfahrenstechnisch und Apparatewesen 39 Jahrgang (Vol), Heft (No) 16, pages 937–992 especially FIG. 2 wherein an attempt is made to improve instruments of the kind described next above by using a split cuvette in the measuring and comparison chambers. Both resulting pathways are modulated as measuring and comparison beam paths to be measured and read. At null point value, when owing to the absence of the component to be analyzed for in the measuring cuvette, no radiation absorption takes place in the range for that component, there still arise on the membrane condenser faint impulses of equal strength which are led to amplifying means. The amplifier is so constructed that it responds only to the nature of this impulse, so that the null point of the instrument as a whole is assured electrically.

An "absolute" null point in the sense that detectors themselves produce no output signal has hitherto not been attained. In the measuring instrument art the aspects of sealing measuring and comparison gas chambers having a partitioning wall presents great difficulties.

SUMMARY OF THE INVENTION

The invention has as an objective to produce an infrared gas analyzer which will overcome these difficulties. The object is attained by means of an instrument having intercepted measuring and comparison beams and especially an instrument having a detector with more than two gas chambers. The novel features are that two detector chambers are disposed one directly after the other, in each path and the energy difference determined is the difference between the respective substantially instantaneous sums of the energies from the absorption of the radiation by the forward gas chambers in their own paths plus that absorbed by the rear chamber in the other paths. That is to say, the quantity measured is (1) absorption in the forward chamber in path I and that in the rear chamber in path II less (2) absorption in forechamber in path II and that in rear chamber in path I.

When the absorption is determined by a differential pressure membrane as a condenser plate, the two forward detector chambers are cross connected by gas conduits to the respective rear chambers in other paths, and the membrane responds to the pressure difference in chambers in different paths, but forward and rear chambers in a given path are not in gaseous communication with each other.

DRAWING

The drawing shows the invention in partially schematic form.

BRIEF DESCRIPTION OF THE PREFERRED EMBODIMENT

The instrument has two ray or beam paths I and II the first being an analysis path and the second a comparison path. The paths are provided with radiators 1 and 2 with associated reflectors 3 and 4 as the sources for the radiation along the respective paths. In path I the rays are attenuated by the analysis gas mixture (assuming an absorptive component to be present) in an analysis cuvette 5; but in path II, the comparison path, the radiation permeates the comparison cuvette 6 that is filled with a comparison gas that is not absorptive in the absorption range of the mixture component to be measured. A motor driven sector disc 7 periodically blocks both beams in like phase. The exit radiation from both cuvettes passes along both paths into two successive detector chambers, one directly ahead of the other in each path, those in the analysis path I being designated 8 and 9 while those in the comparison path are 10 and 11, where the radiation is absorbed by gas within the chambers. A cross conduit 12 connects the upper or forward chamber 10 of the comparison path with the lower or following chamber 9 in the analysis path, where a similar separate conduit 13 connects upper or forward chamber 8 of the analysis path with lower chamber 11 in the comparison path. All chambers are filled with the gas to be analyzed for. A membrane condenser or capacitor 14 in the detector measures the difference in pressure in the two lower chambers 9 and 11 as pressures change due to the intermittent simultaneous blocking of both paths by the shutter. Output signals are developed in leads 15 and 16 to the respective plates of the condenser by change in capacitance thereof in a well known manner, assuming the condenser has a constant voltage applied thereto. The detector chambers and membrane condenser are contained in a unitary metal block 17.

By having the two sources 1 and 2 of equal intensity and an application of Lambert's law, the detector chambers following one another 10 and 11 as well as 8 and 9 are preferably so dimensioned that in the absence of the component of interest in the cuvettes the same amount of radiation absorption occurs in all four chambers and so that substantially no pressure variation should occur between the chambers. This necessitates in general, that the lower chambers be longer than the uppers. In both beam paths the pair of upper chambers are of the same size and the lower are themselves of equal size.

Now at zero concentration of the measured component, as already mentioned at the outset with regard to phase relation, no complete agreement of the pressures in the chambers situated one after the other can actually be attained due to volume difference and probably temperature difference in the forward and rear chambers. However, due to the cross coupling of chambers in each path in a symmetrical manner, the net differential pressure on the membrane 19 in the cavity 14 is not affected. The detector exhibits an exact null point and in the absence of the measured component in the cuvette 5 produces no output signal by the membrane 19.

By having the chambers cross connected an exact null point is attained even when the relative dimensions of the forward and rear chambers are not such as to theoretically absorb the same amounts of energy provided the upper and lower chambers in both ray paths are of respectively the same geometry.

Because of the symmetry of the cross connected chambers the null point is extraordinarily stable under such heretofore upsetting influences as changes in radiation intensity as may occur due to films in the cuvettes, dust or film on the cuvette windows and variations in radiator temperature. For the same reason, even though there be little loss of stability when a separate radiator is used for each beam path a single powered radiator may be used, in conjunction with many known simple optical arrangements for both paths.

The invention lends itself to being substituted in conventional analyzing systems since it is in metal block form and may easily replace other metal block detectors.

Other means for sensing the difference in absorbed energy may be used. For instance by thermo-electric sensors such as resistance thermometers which are connected into a bridge having fixed resistors or by using thermocouples serially connected in opposition. If the beams are modulated an alternating current amplifier may be used to amplify the electric signal. Otherwise a direct current amplifier is needed.

The invention is defined in the following claims.

I claim:

1. In an infrared gas analyzer having means for providing analysis and comparison beams, a cuvette in the path of the analysis beam for holding an analysis sample to be analyzed for an absorptive gas, the improvement comprising:

a detector for comparing the intensity of radiation passing through the cuvette with that of the comparison beam the detector including first incident and immediately following chambers, said first chambers being substantially aligned with one of the beams, said detector further including second incident and immediately following chambers, said second chambers being both substantially aligned with the other beam, the first and second chambers containing said absorptive gas;

first connecting duct means for connecting the first incident chamber to the second following chamber for equalizing gas pressure therein;

second connecting duct means for connecting the second incident chamber to the first following chamber for equalizing gas pressure therein, the first and second incident chambers, respectively, being substantially isolated from the first and second following chambers, respectively, with respect to gas movement therebetween, the following chambers being longer than the incident chambers in direction of beam propagation; and means for measuring the difference between two sums of energy, one sum being that of energy absorbed by the gas in the incident chamber in one beam plus that absorbed by he gas in the following chamber in the other beam, and the other sum being that of energy absorbed by the gas in the incident chamber in said other beam plus that absorbed by the gas in the following chamber in said one beam.

2. In an infrared analyzer as claimed in claim 1 said means for measuring being a differential pressure measurer connected between said first and second following chambers for measuring difference in gas pressure therebetween.

3. In an analyzer as claimed in claim 2, and means for equal phase modulation of both beams, and said differential pressure measurer being a membrane condenser.

4. In an analyzer as claimed in claim 2, wherein one radiator is provided for each beam as the means for producing the beams.

5. In an analyzer as claimed in claim 2, the two incident chambers being of identical geometry and the two following chambers being of identical geometry.

* * * * *